(12) United States Patent
Fukagawa et al.

(10) Patent No.: US 6,890,985 B1
(45) Date of Patent: May 10, 2005

(54) FLUORINE-CONTAINING RESIN POWDER COATING COMPOSITION HAVING EXCELLENT PROPERTY FOR PROTECTING SUBSTRATE

(75) Inventors: Ryoichi Fukagawa, Settsu (JP); Ryuji Iwakiri, deceased, late of Settsu (JP); by Miyuki Iwakiri, legal representative, Minoo (JP); Keisuke Tano, Settsu (JP); Daisuke Tanizawa, Settsu (JP); Nobuhiko Tsuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/869,342
(22) PCT Filed: Oct. 4, 1999
(86) PCT No.: PCT/JP99/05458
§ 371 (c)(1),
(2), (4) Date: Jun. 28, 2001
(87) PCT Pub. No.: WO01/25345
PCT Pub. Date: Apr. 12, 2001

(51) Int. Cl.$^7$ ................................................. C08K 3/34
(52) U.S. Cl. ........................ 524/492; 523/216; 524/493
(58) Field of Search ................................ 524/492, 493; 523/216

(56) References Cited

FOREIGN PATENT DOCUMENTS

| EP | 0 301 557 | 2/1989 |
| EP | 0 442 363 A1 | 8/1991 |
| EP | 0 493 076 | 7/1992 |
| JP | 9-143401 | 6/1997 |

OTHER PUBLICATIONS

"Handbook of Fillers for Plastics", ed. Katz, p. 170 (1987).*
International Preliminary Examination Report for PCT/JP99/05458 dated Mar. 8, 2000.
International Search Report for PCT/JP99/05458 dated Dec. 28, 1999.
European Search Report for EP 99 97 4082 dated Mar. 5, 2004.
Patent Abstracts of Japan; vol. 018, No. 361 (C–1222), Jul 7, 1994 & JP 06 093225 A (Kansai Paint Co Ltd), Apr. 5, 1994.

* cited by examiner

*Primary Examiner*—Edward J. Cain
(74) *Attorney, Agent, or Firm*—Sughrue Mion, PLLC

(57) ABSTRACT

A thermosetting fluorine-containing resin powder coating composition prepared by mixing a fine powder of silicon oxide having an average particle size of $\frac{1}{100}$ or less of that of a powder of fluorine-containing resin powder coating composition in an amount of 0.01 to 5 parts by weight based on 100 parts by weight of the powder of fluorine-containing resin powder coating composition. The thermosetting fluorine-containing resin powder coating composition of the present invention can be used as a coating composition in various fields where weather resistance is required, and can protect a substrate, particularly a metallic substrate sufficiently.

8 Claims, No Drawings

FLUORINE-CONTAINING RESIN POWDER COATING COMPOSITION HAVING EXCELLENT PROPERTY FOR PROTECTING SUBSTRATE

TECHNICAL FIELD

The present invention relates to a thermosetting fluorine-containing resin powder coating composition being excellent in a property for protecting a substrate, particularly a metallic substrate.

BACKGROUND ART

As a resin for a thermosetting powder coating composition, an epoxy resin, acrylic resin and polyester resin have been mainly used.

Also in order to improve weather resistance of general-purpose resins for powder coating compositions, there are proposals that a thermosetting fluorine-containing resin is used as a resin for a powder coating composition (JP-B-6-104792, JP-A-6-345822).

However when the thermosetting fluorine-containing resin powder coating composition is applied on a metallic substrate, there is no problem with weather resistance of the fluorine-containing resin coating film. However, for example, when the coating film is exposed outdoor for a long period of time, deterioration of the metallic substrate advances and corrosion thereof arises mainly due to rust. This phenomenon has not been recognized in case of general-purpose powder coating compositions being inferior in weather resistance and appears remarkably in case of a thermosetting fluorine-containing resin powder coating composition, particularly in case where the composition is coated by an electrostatic powder coating method.

The inventors of the present invention have found that when mixing a silicon oxide powder having a specific relation with a fluorine-containing resin powder, a thermosetting fluorine-containing resin powder coating composition being excellent in a property for protecting a substrate, particularly a metallic substrate can be provided.

It is known that since an expensive fluorine-containing resin is used for the thermosetting fluorine-containing resin powder coating composition, in order to increase a volume coating composition, powders such as a filler and silicon oxide as a pigment are blended to the composition (JP-B-6-104792, JP-A-6-345822 mentioned above). However a particle size thereof is relatively large, and an effect of protecting a substrate cannot be obtained as mentioned hereinafter.

Also there is a proposal that a silicon oxide powder having an average particle size of not more skin 50 $\mu$m (nm) is blended to general-purpose powder coating compositions (JP-A-51-42731). However in that publication, there is only a description that a flowability of the powder coating composition at fluidized bed coating and spray coating is improved but there is no recognition at all about not only thermosetting fluorine-containing resin powder coating composition but also a problem with the above-mentioned protection of a substrate.

DISCLOSURE OF INVENTION

Namely the present invention relates to the thermosetting fluorine-containing resin powder coating composition prepared by mixing a fine powder of silicon oxide having an average particle size of or less of an average particle size of the powder of fluorine-containing resin powder coating composition.

It is preferable that a mining amount of the silicon oxide fine powder is from 0.01 to 5 parts by weight (hereinafter referred to as apart) based on 100 parts of the powder of fluorine-containing resin powder coating composition.

The thermosetting fluorine-containing resin powder coating composition of the present invention can be prepared by melt-kneading a fluorine-containing resin and a curing agent and then pulverizing, and at the time of pulverization or after purilization, a fine powder of silicon oxide having an average particle size of $\frac{1}{100}$ or less of an average particle size of the powder of fluorine-containing resin powder coating composition is mixed to the composition.

Also the present invention relates to the coated article obtained by coating the thermosetting fluorine-containing resin powder coating composition on a metalic substrate.

BEST MODE FOR CARRYING OUT THE INVENTION

The powder of thermosetting fluorine-containing resin powder coating composition to be used in the present invention basically comprises a thermosetting fluorine-containing resin powder, a curing agent, the above-mentioned fine powder of silicon oxide and as case demands, additives such as a pigment.

The thermosetting fluorine-containing resin as a resin component is not limited particularly as far as it is a polymer having a fluorine-containing monomer unit and a crosslinkable reactive group as the essential components.

Examples of the fluorine-containing monomer are, for instance, one or two or more of tetrafluoroethylene, chlorotrifluoroethylene, trifluoroethylene, vinylidene fluoride, hexafluoropropylene, pentafluoropropylene, perfluoro(vinyl ether), monofluoroethylene, and the like. Fther if necessary, non-fluorine-containing monomer may be copolymerized.

Examples of the crosslinkable reactive group are, for instance, hydroxyl group, carboxyl group, amino group, amido group, glycidyl group, isocyanate group, halogen atoms such as bromine and iodine, and the like.

As case demands, in addition to the thermosetting fluorine-containing resin, the above-mentioned general-purpose non-fluorine-containing thermosetting resin such as an epoxy resin, acrylic resin or polyester resin may be blended as a powder resin component.

As the curing agent, those which have been used for thermosetting powder coating compositions can be used. For example, there are a blocked isocyanate compound, acid anhydride, polyamine compound, glycidyl compound, isocyanurate compound, polybasic acid, and the like.

Further various additives which have been usually used for a powder coating composition, for example, a pigment, filler, ultraviolet ray absorber, leveling agent, flowability control agent, antioxidant, heat deterioration preventing agent, gloss control agent, electric charge control agent, and the like may be optionally blended.

Examples of the powder of thermosetting fluorine-containing resin powder coating composition which can be used in the present invention are, for instance, powders of coating compositions prepared from thermosetting fluorine-containing resins described in JP-B-6-104792, JP-A-5-331388, Japanese Patent No. 2782726, etc.

In the present invention the powder of thermosetting fluorine-containing resin powder coating composition to which the fine powder of silicon oxide is blended (hereinafter in some cases referred to as "powder of coating composition") is a powder obtained by mixing a curing agent and as case demands, a pigment and other additives to the thermosetting fluorine-containing resin, melt-kneading the mixture and then pulverizing the obtained melt-kneaded product. An average particle size of the obtained powder is usually from 1 to 150 μm, preferably about 10 μm to about 50 μm. Also as mentioned hereinafter, the fine powder of silicon oxide may be mixed to the fluorine-containing resin and curing agent before melt-kneading, and after the melt-kneading, pulverizing may be carried out.

The, silicon oxide fine powder to be blended to the powder of coating composition is one having an average particle size smaller than that of the powder of coating composition.

Though a function of the fine powders of silicon oxide in the present invention is not clear, since an effect thereof is larger when the fine powder is adhered to a surface of the powder particle of coating composition than when the fine powder is mixed to the powder of coating composition, it can be presumed that electric discharging which arises inevitably at coating, particularly at electrostatic coating in case of a fluorine-containing resin having a higher charging property than general-purpose resins can be effectively inhibited by adhering the fine powders of silicon oxide to the surface of the powder particles of coating composition, thereby preventing a pin hole from arising on a coating film and as a result, an ability for protecting a substrate can be enhanced more.

Therefore though as mentioned above, the fine powders of silicon oxide may be melt-kneaded together with the thermosetting fluorine-containing resin, curing agent, etc. and then pulverized, from the viewpoint of being capable of adhering the fine powders effectively and uniformly on the surfaces of particles of powder of coating composition, it is preferable to mix the fine powders at the time when pulverizing a melt-kneaded product produced from the thermosetting fluorine-contailplg resin, curing agent, etc. or after the pulverization.

A mixing amount of the fine powders of silicon oxide is from 0.01 to 5 parts, preferably 0.02 to 3 parts, more preferably 0.03 to 1 part, particularly preferably 0.05 to 0.5 part based on 100 parts of powders of the thermosetting fluorine-containing resin powder coating composition. When the mixing amount is too large, a coating film becomes turbid and a gloss is lowered. When the mixing amount is too small, an effect of protecting a substrate cannot be obtained.

It is preferable that the fine powders of silicon oxide are those having an average particle size of not more than $1/10,000$, further not more than $1/1,000$ particularly $1/3,000$ to $1/10,000$ of that of particles of the powder of coating composition. Concretely there are fine particles of silicon oxide having an average particle size of from about 5 nm to about 500 nm, further 5 to 50 nm. Further from the viewpoint of excellent storage stability of the powder coating composition, preferable are fine particles of silicon oxide having a pH value in an acid range of from 3 to 7 in case of a 4% aqueous dispersion thereof. Also from the viewpoint of good affinity for the fluorine-containing resin, those having hydrophobic property are preferable. Also those containing a slight amount of impurities, for example, metal oxide such as aluminum oxide, iron oxide or titanium oxide may be used.

Examples of a substrate which is expected to be protected by the powder coating composition of the present invention are metallic substrates made of aluminum, stainless steel, copper, cold rolled steel plate, zinc plated steel plate, and the like, substrates made of plastic and rubber and substrates made of natural material such as wood or stone. The present invention is most suitable for protection of metallic substrates, particularly substrates of stainless steel and various steel plates which have a big problem with corrosion due to rusting.

Though various coating methods which have been used for coating of powder coating composition can be used, an effect of the present invention can be expected most in electrostatic coating in which there is a problem particularly with occurrence of a pin hole. Coating conditions may be the samne as in usual coating.

Non-restricted examples of products obtained by coating the thermosetting fluorine-containing resin powder coating composition of the present invention are, for instance, those raised below.

Building Material:
Aluminum sash, fence, gate, balcony, handrail, grating, shutter, door and terrace Domestic Goods and Appliances (Electric Appliances, etc.):
Basket, pan, various cleaning utensils, range, range hood, air conditioning facilities, cooler/heater equipment, washing machine, ventilator and sewing machine Safety Utensils:
Fire hydrant, fire fighting facilities, pole for fire hydrant, safety net for prevention of falling and safety shoes Aircraft:
Exterior of aircraft Vessel:
Outboard equipment, screw, raider and bottom plating Vehicle (automobile, train, etc.):
Exterior and interior of vehicle body, wiper, bumper, wheel, pipe, brake, sunroof, grip of door, shift lever, drive shaft, joint of rails, bolt and nut Other Metallic Products:
Bomb, drum, pail, brewing tank, container, desk, chair, various interior parts and decorations of furniture Then the present invention is explained by means of examples, but is not limited to them.

EXAMPLE 1

Preparation of Thermosetting Fluorine-containing Resin Powder Coating Composition A chlorotrifluoroethylene/cyclohexyl vinyl ether/isobutyl vinyl ether/hydroxybutyl vinyl ether (weight ratio: about 50/16/9/25) copolymer (hydroxyl value: 120 mgKOH/g, glass transition temperature: 45° C., weight reduction by heating: not more than 2% by weight, intrinsic viscosity measured at 30° C. in tetrahydrofuran: 0.21) was pulverized with an impact hammer mill to give a thermosetting fluorine-containing resin powder. After 44 parts of the fluorine-containing resin powder, 30 parts of a pigment (titanium parts of a curing agent (ADDUCT B-1530 available from Huls Co., Ltd.) were uniformly mixed for about one minute with a dry blender (Henschel mixer available from Mitsui Kako Kikai Kabushili Kaisha), the mixture was melt-kneaded at a temperature of from 80° to 100° C. with an extrusion kneader (Buss Co-kneader PR-46 available from Buss Co., Ltd.), and after cooling, the kneaded product was finely pulverized with an impact hammer mill. Flurther coarse particles were removed through a 150 mesh metal net to give a powder of thermosetting fluorine-containing resin powder coating composition to be used in Examples (average particle size: 35 μm).

Mixing of Fine Powder of Silicon Oxide

To 100 g of the obtained powder of thermosetting fluorine-containing resin powder coating composition was added 0.07 g of hydrophobic fine powder of silicon oxide having an average particle size of 7 nm (AEROSIL 380 available from Nippon Aerosil Co., Ltd., pH value in case of 4% aqueous dispersion thereof: 4), fodlowec by dry blending with the above-mentioned dry blender for 15 minutes to give the thermosetting fluorine-containing resin powder coating composition of the present invention.

Test for Protection of Substrate

The obtained thermosetting fluorine-containing resin powder coating composition was applied on a stainless steel plate (SUS304) subjected to chromate treatment in a thickness of 0.03 mm by electrostatic coating at an applied voltage of 60 kV with a corona discharge powder coating gun (GX33000 available from Onoda Cement Kabushiki Kaisha), followed by baking at 200° C. for 15 minutes to give a coated test plate.

The following characteristics were evaluated by using the coated plate. The results are shown in Table 1.

Appearance of Coating Film

A surface of the coating film of the obtained coated plate was observed with naked eyes, and evaluation was made; particularly with respect to smoothness (unevenness) and a pin hole of the surface.

Weather Resistance

The obtained coated plate was exposed outdoor for two years in Miyakojima Island of Okinawa-ken, and a state of a surface of coating film and a state of a substrate before and after the exposure were observed with naked eyes. Criteria for evaluation was as mentioned below.

A: No change in both of coating film and substrate.
B: White spots (change in color) on the coating film, but no change on the substrate.
C: White spots (change in color) on the coafdng film and partly rusting (filiform rusting).
D: White spots (change in color) widely on the coating film and rusting on the whole surface of the substrate.

EXAMPLES 2 to 3

Thermosetting fluorine-containing resin powder coating compositions of the present invention were prepared in the same manner as in Example 1 except that a fine powder of silicon oxide having an average particle size of 12 nm (AEROSIL 200 available from Nippon Aerosil Co., Ltd., Example 2) and a fine powder of silicon oxide having an average particle size of 100 nm (pulverized molten silica, Example 3) were used as the fine powder of silicon oxide, and then coated test plates were produced. Characteristics of the coated plates were evaluated in the same manner as in Example 1. The results are shown in Table 1.

EXAMPLE 4

0.07 Gram of silicon oxide fine powders having an average-particle size of 7 nm (the above-mentioned AEROSIL 380) was dry-blended with the same fluorine-containing resin, pigment (titanium dioxide) and curing agent (amounts thereof were also the same) as used in Example 1, followed by melt-kneading, pulverizing and sieving to give a thermosetting fluorine-containing resin powder coating composition having an average particle size of 35 μm.

A coated plate was produced in the same manner as in Example 1 by using the obtained powder coating composition, and characteristics thereof were evaluated. The results are shown in Table 1.

COMPARATIVE EXAMPLE 1

A thermosetting fluorine-containing resin powder coating composition for comparison was prepared in the same manner as in Example 1 except that a fine powder of silicon oxide was not used.

A coated plate was produced in the same manner as in Example 1 by using the obtained powder coating composition, and characteristics thereof were evaluated. The results are shown in Table 1.

COMPARATIVE EXAMPLE 2

A thermosetting fluorine-containing resin powder coating composition for comparison was prepared in the same manner as in Example 1 except that a powder of silicon oxide having an average particle size of 40,000 nm (pulverized molten silica) was used as a silicon oxide powder.

A coated plate was produced in the same manner as in Example 1 by using the obtained powder coating composition, and characteristics thereof were evaluated. The results are shown in Table 1.

COMPARATIVE EXAMPLE 3

A thermosetting epoxy resin powder coating composition for comparison was prepared in the same manner as in Example 1 except that an epoxy resin (EPICOAT 1004 available from Shell Chemical Co., Ltd.) was used as a resin for powder coating composition and EPICURE 108FF available from Shell C:)umical Co., Ltd. was used as a curing agent.

A coated plate was produced in the same manner as in Example 1 by using the obtained powder coating composition, and characteristics thereof were evaluated. The results are shown in Table 1.

TABLE 1

|  | Average particle size of silicon oxide powder (nm) | Timing of mixing of silicon oxide powder | Appearance of coating film (before weather resistance test) | Weather resistance test |
| --- | --- | --- | --- | --- |
| Ex. 1 | 7 | After pulverization | Good | A |
| Ex. 2 | 12 | After pulverization | Good | B |
| Ex. 3 | 100 | After pulverization | Good | C |
| Ex. 4 | 7 | Before melt-kneading | Good | C |
| Com. Ex. 1 | — | — | Small pin holes were generated | D |

TABLE 1-continued

| | Average particle size of silicon oxide powder (nm) | Timing of mixing of silicon oxide powder | Appearance of coating film (before weather resistance test) | Weather resistance test |
|---|---|---|---|---|
| Com. Ex. 2 | 40000 | After pulverization | Good | D |
| Com. Ex. 3 | 7 | After pulverization | Good | D |

As it is clear from Table 1, it can be recognized that the thermosetting fluorine-containing resin powder coating composition prepared by mixing a fine powder of silicon oxide is excellent in weather resistance and exhibits a protective effect of a substrate. Particularly by mixing the fine powder of silicon oxide to the powder of coating composition after pulverization, it can be recognized that an ability of protecting a substrate is enhanced. Also when a general-purpose epoxy resin is used, weather resistance is inferior and the substrate is greatly influenced.

INDUSTRIAL APPLICABILITY

The thermosetting fluorine-containing resin powder coating composition of the present invention can be used as a coating trn composition in various fields where weather resistance is required and a substrate can be protected sufficiently.

What is claimed is:

1. A thermosetting fluorine-containing resin powder coating composition of a thermosetting fluorine-containing resin powder and a fine powder of silicon oxide, wherein said thermosetting fluorine-corizaininp resin powder coating composition is prepared by adhering said fine powder of silicon oxide having an average particle size of $1/100$ or less of an average particle size of a powder of fluorine-containing resin powder to thermosetting fluorine-containing resin powder.

2. The thermosetting fluorine-containing resin powder coating composition of claim 1, wherein 0.01 to 5 parts by weight of said fine powder of silicon oxide based on 100 parts by weight of the powder of fluorine-containing resin powder coating composition is adhered.

3. The thermosetting fluorine-containing resin powder coating composition of claim 1, wherein an average particle size of said fine powder of silicon oxide is $1/1,000$ or less of an average particle size of the powder of fluorine-containing resin powder.

4. The thermosetting fluorine-containing resin powder coating composition of claim 1, wherein the fluorine-containing resin powder is a powder obtained by pulverizing a melt-kneaded product of a fluorine-containing resin and a curing agent.

5. A process of preparing a thermosetting fluorine-containing resin powder coating composition by melt-kneading a fluorine-containing resin and a curing agent and pulverizing, in which after pulverizing, a fine powder of silicon oxide having an average particle size of $1/100$ or less of an average particle size of the pulverized powder of fluorine-containing resin powder is mixed.

6. The preparation process of claim 5, wherein 0.01 to 5 parts by weight of said fine powder of silicon oxide is mixed based on 100 parts by weight of the powder of fluorine-containing resin powder.

7. The preparation process of claim 5, wherein an average particle size of said fine paacies of silicon oxide is $1/1,000$ or less of an average particle size of the powder of fluorine-containing resin powder.

8. A coated article obtained by applying the thermosetting fluorine-containing resin powder coating composition of claim 1 on a metallic substrate.

* * * * *